United States Patent [19]
Moffett, III

[11] 4,157,028
[45] Jun. 5, 1979

[54] PORTABLE UNIVERSAL APPARATUS FOR USE IN PRESSURE TESTING ENGINE CYLINDER HEADS AND BLOCKS

[76] Inventor: George A. Moffett, III, 115 Stuart Dr., Vidalia, La. 71373

[21] Appl. No.: 893,979

[22] Filed: Apr. 6, 1978

[51] Int. Cl.² .................................... G01M 15/00
[52] U.S. Cl. ............................................. 73/49.7
[58] Field of Search ............... 73/49.7, 49.8, 46, 47, 73/45.5

[56] References Cited

U.S. PATENT DOCUMENTS

| | | | |
|---|---|---|---|
| 1,701,876 | 2/1929 | Fleming | 73/47 |
| 3,360,984 | 1/1968 | Salsbury et al. | 73/49.7 |
| 3,608,369 | 9/1971 | Wilkinson | 73/49.7 X |
| 3,751,978 | 8/1973 | Crawford | 73/49.7 |
| 3,973,429 | 8/1976 | Durgan et al. | 73/49.7 |

Primary Examiner—Charles A. Ruehl
Assistant Examiner—Joseph W. Roskos
Attorney, Agent, or Firm—Shlesinger, Arkwright, Garvey & Dinsmore

[57] ABSTRACT

A portable universal apparatus for use in pressure testing engine cylinder heads and blocks. Sealing members are placed over all surface openings of an engine cylinder head or block leading to the cooling jacket. Retaining bars are placed over the sealing members and extend longitudinally of the engine part. A plurality of clamping units are attached directly to the engine part and apply pressure to the clamping bars in a direction to effect airtight engagement of the sealing members with the surface openings of the cooling jacket.

13 Claims, 8 Drawing Figures

PORTABLE UNIVERSAL APPARATUS FOR USE IN PRESSURE TESTING ENGINE CYLINDER HEADS AND BLOCKS

BACKGROUND OF INVENTION

It has been conventional practice to test engine parts such as cylinder heads and blocks to detect leaks in the cooling jacket by sealing openings leading to the cooling jacket with a single plate and gasket to seal off the head gasket area of the head or block. The plate is secured by bolts threadedly engaged with complemental openings in the head or block. Air is then injected into the cooling jacket following which a soap solution is used to detect leaks, cracks, etc.

Apparatus of the above type is limited in usage because one plate fits only one application and many different sizes and lengths of bolts are required to secure the same to the engine cylinder head or block. By employing a solid plate and gasket, it is furthermore impossible to see all problem areas of the part being tested.

In U.S. Pat. No. 3,360,984 granted to H. I. Salsbury et al on Jan. 2, 1968, there is disclosed a universal testing apparatus for cylinder heads which is applicable to a greater variety of engine parts. In this device, individual sealing members are placed over the cooling jacket openings, the sealing members in turn being clamped to a stand placed over the engine part. The stand necessarily limits the size and type of engine part that can be tested because of numerous differences in sizes of engine cylinder heads and blocks.

The Salsbury apparatus furthermore is designed for fluid pressure testing wherein, as noted above, air under pressure is injected into the cooling jacket, following which a soap solution is applied to the cylinder block for detecting leaks or cracks.

It has been found, however, that this type of test is not always dependable since air pockets sometime develop within the cooling jacket in the area of the leak and, consequently, the leaks do not show. Also, applying a soap solution to a cylinder head or block can result in missing a crack that is not accessible.

A preferable and more dependable type of testing has been developed wherein air is injected under pressure into a sealed water jacket of a cylinder head or block and then the engine part is submerged in a hot water vat whereby air bubbles are immediately visible where there are any cracks in the engine head or block.

In view of the necessity of employing a stand in conjunction with the sealing members in the Salsbury apparatus, it is virtually impossible to use the Salsbury apparatus in testing an engine part by submerging it in a hot water vat.

SUMMARY OF THE INVENTION

The present invention is an apparatus for use in testing engine cyclinder heads and blocks to determine the presence and location of leaks in the cooling jacket, the apparatus being particularly adapted for testing by means of air injected into the cooling jacket followed by submersion of the engine in a hot water vat.

The apparatus of the present invention is portable and can be used in the testing of a large variety of engine cylinder heads and blocks of virtually every type with the exception of wet sleeve design blocks. The apparatus comprises a minimum of parts of economical construction which are readily attached directly to the engine part, and requiring no supporting stand or the like to effect engagement of the apparatus to the engine part.

The apparatus includes a plurality of individual sealing members which are placed over surface openings of the engine cooling jacket and held by retaining means extending longitudinally of the cylinder head or block. A plurality of clamping units are attached to the engine and exert force on the retaining means in a direction to urge the sealing members into airtight engagement with the cooling jacket openings.

The present attachment further leaves a maximum portion of the problem areas of the engine part exposed in order that leaks may be more readily detected. Also, by attaching the apparatus directly to the engine part, it may be tested by any method presently used for detecting leaks.

DETAILED DESCRIPTION OF THE INVENTION

Figure 1:
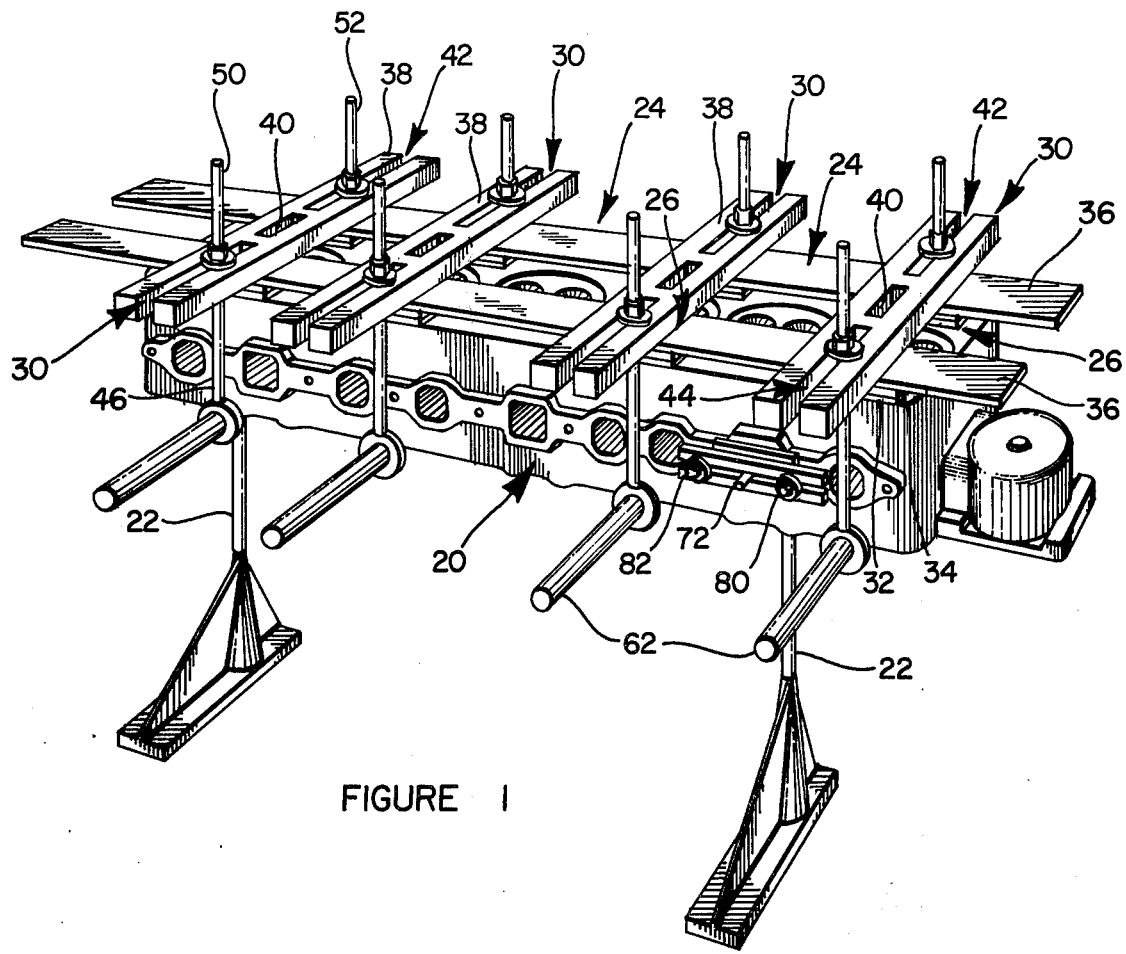
FIG. 1 is a perspective view illustrating the application of the apparatus of the present invention.
Figure 2:
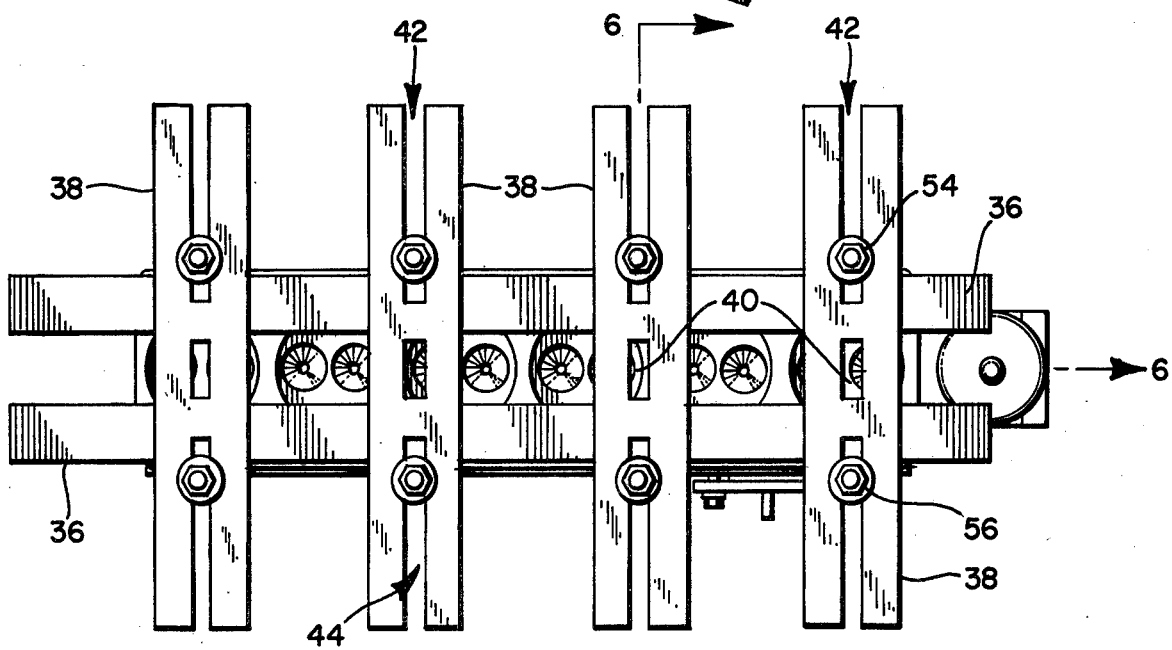
FIG. 2 is a top plan view thereof.
Figure 3:
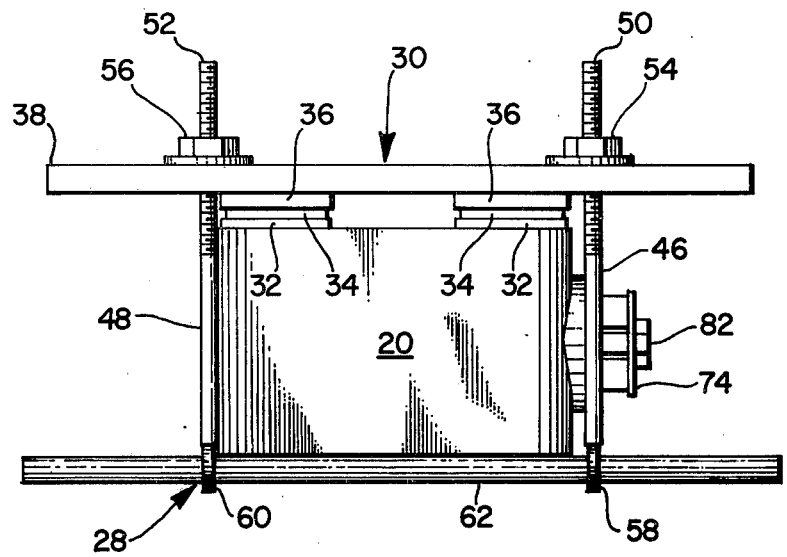
FIG. 3 is an end elevational view thereof.

In FIGS. 1 to 3 there is illustrated an engine part 20 which may be either a cylinder head or a cylinder block, which engine part is supported by spaced stanchions 22.

Apparatus for use in the testing of the engine part is generally designated 24 and includes a sealing member assembly 26 which is placed over surface openings 28 of the cooling jacket of engine part 20. Sealing member assemblies 26 are held in airtight engagement with surface openings 28 by a plurality of clamping assemblies 30 which are attached directly to engine part 20.

Figure 8:
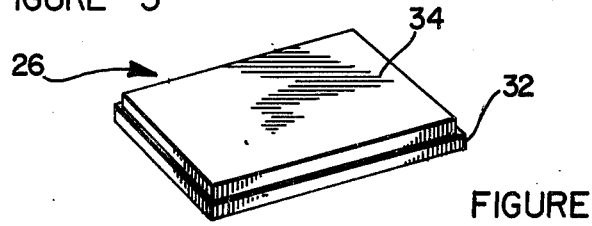
FIG. 8 is a perspective view of a sealing member forming a part of the present invention.

As shown to advantage in FIG. 8, each sealing member 26 includes a gasket 32 of any suitable material and of rectangular conformation on top of which is placed a metallic sealing plate 34 which is of the approximate size of gasket 32. Each sealing member assembly is placed over openings leading to the cooling jacket on the head gasket surface of the block or head as shown to advantage in FIG. 1.

The present apparatus further includes a pair of elongated retaining bars 36 which are placed on top of sealing member assemblies 26 and extend longitudinally of the engine part in spaced relation to each other.

It is a salient part of the present invention to provide a plurality of clamping assemblies 30, the number of clamping assemblies preferably corresponding to the number of cylinders of the engine. Each clamping assembly includes a flat clamp bar 38 which extends transversely of engine part 20 and rests on retaining bars 36. Each clamp bar 38 is provided with a longitudinally extending central slot 40 and end longitudinal slots 42 and 44, the end slots extending to a point adjacent, but spaced from, central slot 40.

Slots 42 and 44 are adapted to receive elongated bolts 46 and 48, the upper ends of which are threaded at 50 and 52. The bolts 46 and 48 extend vertically with respect to transverse bar 38, the bolts being adjacent the opposed sides of engine part 20. Threaded ends 50 and 52 of bolts 46 and 48 extend through slots 42 and 44 and are adapted for threaded engagement with nut and washer units 54 and 56 respectively.

As shown in FIG. 3, the lower ends of bolts 46 and 48 are provided with terminal eyes 58 and 60 which are in opposed facing relationship immediately below the engine part 20. A cylindrical clamp bar 62 extends through eyes 58 and 60 as shown in FIG. 3, the outer periphery of the bar being in contiguous engagement with the lower extremity of engine part 20.

Therefore, upon tightening of nut and washer units 54 and 56 on bolts 46 and 48, a force is exerted on transverse clamp bar 38 which force is transmitted to elongated bars 36 to urge sealing member assemblies 26 into sealing engagement with surface openings 28 of the cooling jacket.

All holes leading into the water jacket on the top, sides and ends must be sealed before the cylinder head or block can be tested. In accordance with standard practice, pipe plugs (not shown) may be employed to seal other holes leading into the cooling jacket.

Figure 4:
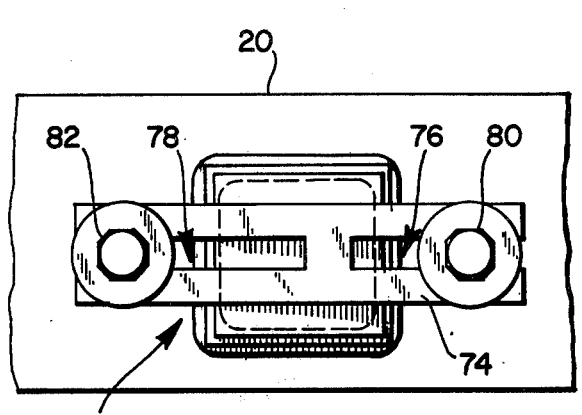
FIG. 4 is an enlarged fragmentary side elevational view of a portion of the present invention illustrating its application.
Figure 6:
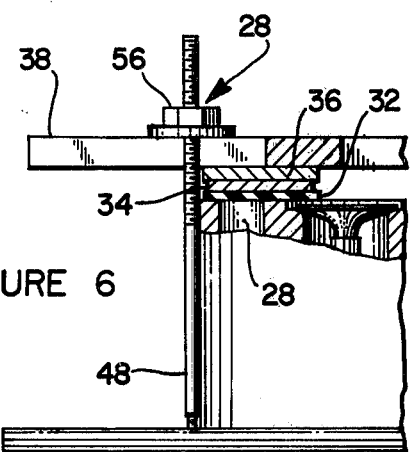
FIG. 6 is an enlarged sectional view taken along the line 6—6 of FIG. 2, looking in the direction of the arrows.
Figure 5:
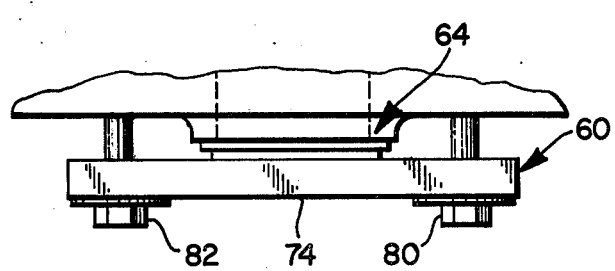
FIG. 5 is a top plan view of the portion of the invention shown in FIG. 4.
Figure 7:
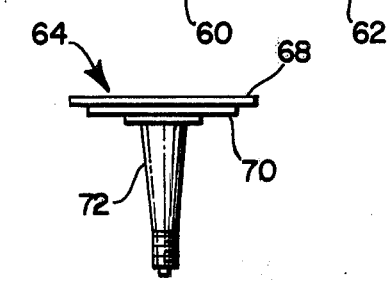
FIG. 7 is a side elevational view of a valve plate forming a part of the present invention.

In order to facilitate use of the apparatus of the present invention for testing by means of air injected into the engine part under pressure, a side surface opening leading to the cooling jacket may be provided with an attachment which includes a sealing member assembly 64 and a clamping assembly 66 which are shown to advantage in FIGS. 4, 5 and 7. Sealing member 64 includes a gasket 68 and a sealing plate 70, to the central portion of which is connected a conventional air valve 72 for injecting air under pressure into the water jacket.

Clamping assembly 66 includes a flat bar 74 having longitudinal slots 76 and 78 which are adapted to receive bolt and washer units 80 and 82 which are threaded into complemental openings in the side of engine part 20.

In accordance with this invention, air is injected under pressure into the water jacket of engine part 20 through valve 72, following which the engine part is lifted and submerged in a hot water vat for testing. Bubbles identify the presence and location of leaks or fractures in the engine part. Engine part 20 may also be tested, if desired, by spraying a bubble solution thereon or by injecting liquid into the water jacket which will spray out at the point of the leak.

Although any suitable gasket material may be employed for the sealing members of the present invention, it has been found that gaskets made of ¼" neoprene of a size slightly larger than the openings over which they are placed effect excellant results. Also, although there is disclosed in FIG. 1 of the drawing only one side sealing member assembly in clamping assembly, a number of these assemblies is employed corresponding to the side surface openings to the cooling jacket.

The apparatus of the present invention is completely universal and can be used on all types of cylinder heads and blocks with the exception of wet sleeve design blocks, the apparatus being furthermore useful in checking cylinder heads of any shape, including round heads. By virtue of the fact that the apparatus comprises a very few parts, it may be manufactured for a fraction of the cost of existing testing equipment. In view of the attachment of the apparatus directly to the engine part being tested, any method of testing for leaks may be employed.

While there has been herein shown and described the presently preferred form to this invention, it is to be understood that such has been done for purposes of illustration only, and that various changes may be made therein within the scope of the appended claims.

I claim:

1. Apparatus for use in the fluid pressure testing of an engine part having a cooling jacket with surface openings connected thereto, said apparatus including:
   (a) a plurality of sealing members placed over the surface openings,
   (b) retaining means engageable with said sealing members for holding the latter in position, and
   (c) clamping means attached directly to the engine part and engageable with said retaining means,
   (d) said clamping means including pairs of opposed shafts laterally of the engine part and extending between opposed surfaces thereof,
   (e) a first set of clamp bars extending transversely of, and engaged with, one of the opposed surfaces of the engine part, said first set of clamp bars being connected to one end of said pairs of opposed shafts,
   (f) a second set of clamp bars extending transversely of the other of the opposed surfaces of the engine part and superimposed on said retaining means,
   (g) said clamping means further including means engageable with the other end of said pairs of opposed shafts for exerting force on said first and second sets of clamp bars in a direction to urge said sealing members into airtight engagement with the surface openings of the cooling jacket.

2. The apparatus of claim 1, wherein:
   (a) each of said sealing members include a gasket, and
   (b) a sealing plate engageable with one face of said gasket.

3. The apparatus of claim 1, wherein:
   (a) said retaining means includes elongated flat bars extending longitudinally of the engine part in superimposed engagement with said sealing members.

4. The apparatus of claim 1, wherein:
   (a) each of said opposed shafts comprises a bolt, one end of which is formed to provide an eye through which said clamp bar passes,
   (b) the opposite end of each bolt being threaded and extends through said clamp bar, and
   (c) nuts threadedly engaged with the threaded ends of said bolts.

5. The apparatus of claim 4, wherein:
   (a) the extremities of said clamp bars are provided with slots through which said bolts pass.

6. The apparatus of claim 1, with the addition of:
   (a) sealing members over cooling jacket surface openings on the side of the engine part,
   (b) clamping means engaged with said sealing members for holding said sealing members in airtight engagement with the cooling jacket surface openings, and
   (c) an air valve mounted one of said sealing members in communication with the cooling jacket opening whereby air under pressure is injected into the cooling jacket for testing the engine part for leaks.

7. Apparatus for use in the fluid pressure testing of an engine part having a cooling jacket with surface openings connected thereto, said apparatus including:
(a) a plurality of individual sealing members placed over the water jacket surface openings on the upper surface of the engine part,
(b) elongated flat bars placed on top of said sealing members and extending longitudinally of the engine part, and
(c) clamping means attached directly to the engine part and engaged with said elongated flat bars for urging said sealing members into airtight engagement with the water jacket surface openings,
(d) said clamping means including a plurality of assemblies positioned around the engine part,
(e) each of said assemblies comprising a bar extending transversely of the upper surface of the engine part and superimposed on said elongated flat bars, the ends of said transverse bar having longitudinal slots,
(f) a pair of opposed bolts laterally of the engine part extending from the upper to the lower surface thereof,
(g) the lower end of each of said bolts being formed to provide an eye,
(h) a clamp bar extending transversely of, and contiguous with, the lower surface of the engine part,
(i) the ends of said clamp bar extending through the eyes of said opposed bolts,
(j) the upper ends of said opposed bolts extending through the longitudinal slots of the transverse bar, and
(k) nuts threadedly engaged with the upper ends of said opposed bolts for drawing said clamp bar down on said sealing members for forcing the latter into airtight engagement with the water jacket surface openings.

8. The apparatus of claim 7, with the addition of:
(a) sealing members over cooling jacket surface openings on the side of the engine part,
(b) clamping means engaged with said sealing members for holding said sealing members in airtight engagement with the cooling jacket surface openings, and
(c) an air valve mounted one of said sealing members in communication with the cooling jacket opening whereby air under pressure is injected into the cooling jacket for testing the engine part for leaks.

9. Apparatus for use in the fluid pressure testing of an engine part having a cooling jacket with surface openings connected thereto, said apparatus including:
(a) a plurality of sealing members placed over the surface openings of the cooling jacket,
(b) a first means for holding said sealing members in operative position over the surface opening,
(c) a second means attached directly to the engine part for exerting force on said sealing members in a direction to effect airtight engagement of the latter with the surface openings,
(d) a sealing member over a cooling jacket surface on the side of the engine part,
(e) clamping means engaged with said sealing member for holding said sealing member in airtight engagement with the cooling jacket surface opening, and
(f) an air valve mounted in said sealing member and in communication with the cooling jacket opening, whereby air under pressure is injected into the cooling jacket for testing the engine part for leaks.

10. Apparatus for use in the fluid pressure testing of an engine part having a cooling jacket with surface openings connected thereto, said apparatus including:
(a) a plurality of sealing members placed over the surface openings of the cooling jacket,
(b) a first means for holding said sealing members in operative position over the surface openings,
(c) a second means in surrounding relation to said engine part, said second means being in engagement with said first means and that portion of the engine part opposite the surface openings of the cooling jacket, and
(d) a third means engageable with said first and second means for exerting force on said first means and sealing members in a direction to effect airtight engagement of the latter with the surface openings.

11. The apparatus of claim 10, wherein:
(a) said first means includes elongated flat bars extending longitudinally of the engine part in superimposed engagement with said sealing members.

12. The apparatus of claim 10, wherein:
(a) said second means includes a plurality of bars extending transversely of the upper surface of the engine part and superimposed on said first means,
(b) pairs of spaced, opposed shafts laterally of the engine part extending from the upper to the lower surface thereof, and
(c) clamp bars extending transversely of the engine part and engageable with an end of each of said opposed shafts, said clamp bars being engaged with the lower surface of the engine part.

13. The apparatus of claim 12, wherein:
(a) said third means includes nuts threadedly engaged with said shafts for forcing said transverse bars against said first means.

* * * * *